US012204316B2

(12) United States Patent
Stritzinger et al.

(10) Patent No.: US 12,204,316 B2
(45) Date of Patent: Jan. 21, 2025

(54) METHOD FOR OPERATING A PRODUCTION PLANT WITH DISTRIBUTED COMPUTERS

(71) Applicants: Dipl. Phys. Peer Stritzinger GmbH, Maisach (DE); Robert Bosch GmbH, Stuttgart (DE)

(72) Inventors: Peer Stritzinger, Maisach (DE); Jochen Schramm, Neckarsulm (DE)

(73) Assignees: Dipl. Phys. Peer Stritzinger GmbH, Maisach (DE); Robert Bosch GmbH, Stuttgart (DE)

( * ) Notice: Subject to any disclaimer, the term of this patent is extended or adjusted under 35 U.S.C. 154(b) by 488 days.

(21) Appl. No.: 17/657,487

(22) Filed: Mar. 31, 2022

(65) Prior Publication Data
US 2022/0334561 A1 Oct. 20, 2022

(30) Foreign Application Priority Data
Apr. 20, 2021 (DE) ...................... 10 2021 203 892.1

(51) Int. Cl.
*G05B 19/418* (2006.01)
*G05B 23/02* (2006.01)

(52) U.S. Cl.
CPC ..... *G05B 19/4183* (2013.01); *G05B 19/4185* (2013.01); *G05B 19/4189* (2013.01); *G05B 23/0245* (2013.01); *G05B 2219/25294* (2013.01)

(58) Field of Classification Search
None
See application file for complete search history.

(56) References Cited

U.S. PATENT DOCUMENTS

| | | | |
|---|---|---|---|
| 2017/0182611 A1* | 6/2017 | Spiesshofer | B65G 47/90 |
| 2019/0389019 A1* | 12/2019 | Sticht | B65G 17/32 |
| 2020/0142387 A1* | 5/2020 | Wahrén | G05B 19/4185 |

FOREIGN PATENT DOCUMENTS

| | | | |
|---|---|---|---|
| DE | 0507081 A1 * | 10/1992 | |
| DE | 44 31 836 B4 | 4/1996 | |
| DE | 44 39 107 A1 | 5/1996 | |
| DE | 195 00 546 A1 | 7/1996 | |
| DE | 10 2018 204 644 A1 | 10/2019 | |

(Continued)

OTHER PUBLICATIONS

DE-102015121884-A1 (Year: 2017).*

(Continued)

*Primary Examiner* — Hien D Khuu
(74) *Attorney, Agent, or Firm* — Maginot, Moore & Beck LLP

(57) ABSTRACT

The disclosure relates to a method for operating a production plant having a plurality of processing stations, wherein the workpieces to be processed can be transported to the various processing stations by means of a transport system, wherein a plurality of computers are provided which are connected for data exchange via a computer network, the production plant being controlled by means of a plurality of control processes. According to the disclosure, during the operation of the production plant an initial decision is taken automatically about which control process is executed on which computer, wherein the initial decision is then implemented automatically.

14 Claims, 3 Drawing Sheets

(56) References Cited

FOREIGN PATENT DOCUMENTS

EP      2 072 429 A1      6/2009

OTHER PUBLICATIONS

EP-0507081-A1 (Year: 1992).*
EP-2135823-B1 (Year: 2012).*
WO-2018234388-A1 (Year: 2018).*
AT-519665-A4 (Year: 2018).*
ES-2818196-T3 (Year: 2021).*
Weber, M.; "Unterstützung der Wandlungsfähigkeit von Produktionsanlagen durch innovative Softwaresysteme", Der Technischen Fakultät der Universität Erlangen-Nürnberg, May 21, 2007.
"Transfersystem TS 1", https://www.boschrexroth.com/de/de/produkte/produktgruppen/montagetechnik/transfersysteme/transfersystem-ts-1, Feb. 13, 2019.
"Transfersystem TS 2 plus", https://www.boschrexroth.com/de/de/produkte/produktgruppen/montagetechnik/transfersysteme/transfersystem-ts-2plus, Feb. 13, 2019.
"The MOSIX Cluster Management System for Parallel Computing on Linux Clusters and Multi-Cluster Private Clouds", http://www.mosix.cs.huji.ac.il/pub/MOSIX_wp.pdf, White Paper, 1999-2021.
"Conflict-free replicated data type", https://en.wikipedia.org/wiki/Conflict-free_replicated_data_type, Oct. 15, 2021.
"LXC", https://de.wikipedia.org/wiki/LXC, Dec. 25, 2021.
"Profinet", https://de.wikipedia.org/wiki/Profinet, Feb. 25, 2022.
"Sercos Automation Bus", https://www.sercos.de/, accessed on Internet Mar. 17, 2022.
"Erlang", https://www.erlang.org/, accessed on Internet Mar. 17, 2022.
"Grisp", https://www.grisp.org/, accessed on Internet Mar. 17, 2022.

* cited by examiner

METHOD FOR OPERATING A PRODUCTION PLANT WITH DISTRIBUTED COMPUTERS

This application claims priority under 35 U.S.C. § 119 to application no. DE 10 2021 203 892.1, filed on Apr. 20, 2021 in Germany, the disclosure of which is incorporated herein by reference in its entirety.

TECHNICAL FIELD

The disclosure relates to a method for operating a production plant with a transport system.

SUMMARY

For example, the transport systems TS1 or T2plus supplied by Bosch Rexroth AG can be used as part of the disclosure (https://www.boschrexroth.com/de/de/produkte/produktgruppen/montagetechnik/transfers ysteme/transfer-system-ts-1; https://www.boschrexroth.com/de/de/produkte/produktgruppen/montagetechnik/transfers ysteme/transfersystem-ts-2plus). In these systems, workpieces are transported on transport sections, each of which has two parallel, continuously moving conveyor belts. Diverter devices and curves are used to create a branched system of transport routes so that the workpieces can be transported to all processing stations of the production plant. In current operational practice, such transport systems are controlled by a central PLC controller with regard to the processing sequence, i.e. all the stop gates, transport drives and reading devices are connected to the same central PLC controller, wherein the control processes are carried out by the PLC controller alone.

The result of this basic concept is that the control processes of large production plants are based on extremely complicated software code. In the doctoral thesis "Supporting the conversion capability of production plants using innovative software systems", which was accessed at the web address https://www.faps.fau.de/wp-content/uploads/2019/12/Weber-2007-Unterst%C3%BCtzung-der-Wandlungsf%C3%A4higkeit-von-Produktionsanlagen.pdf on 26.03.2021, an attempt was made to remedy this problem by means of a distributed computer structure. In this approach, the production plant has multiple computers. The production plant has a modular structure, wherein it is attempted to determine the mechanical structure of the production plant automatically and to use it as part of the plant control system.

It has been shown that this approach very easily leads to an overload of the computers and the computer network if the intention is to use inexpensive computers and network components.

One advantage of the present disclosure is that it is possible to avoid overloading individual computers and/or network connections in a cost-effective manner. In addition, the independent detection of the plant structure is supported in an advantageous way. Furthermore, the production plant can react flexibly to the failure or the slowing down of individual plant components while continuing to operate.

A method for operating a production plant having a plurality of processing stations is proposed, wherein the workpieces to be processed can be transported to the different processing stations by means of a transport system, the transport system comprising a plurality of transport sections, each having a transport drive for transporting the workpieces, wherein the transport sections are connected to each other by switchable diverter devices and/or curves in such a way that they form a branched system of transport routes by means of which the workpieces can be transported to all processing stations, wherein a plurality of stop gates are provided, each of which is arranged on an associated transport section, in order to stop the workpieces, wherein a plurality of reading devices are provided, each of which is arranged on an associated transport section, wherein each reading device can be used to read an information carrier which is attached to a workpiece passing by the relevant reading device, wherein the transport system comprises a plurality of separate computers which are connected for data exchange via a computer network, wherein each transport drive, each stop gate, each diverter device and each reading device is directly connected to a respectively assigned computer in such a way that data can be exchanged with the relevant computer, bypassing the computer network, wherein data can be exchanged with the remaining computers via the computer network, wherein the diverter devices, the transport drives and the stop gates are controlled by means of a plurality of separate control processes which are executed in parallel or quasi-parallel, taking into account information from the reading devices, and communicating with each other exclusively via messages which can be transmitted via the computer network, wherein during the operation of the production plant an initial decision is taken automatically about which control process is executed on which computer, wherein the initial decision is then implemented automatically.

The above-mentioned initial decision is preferably taken and implemented multiple times during the operation of the production plant. If a control process is subsequently to be transferred from a computer to a new computer, this is preferably carried out by copying the relevant control process with its program code and all its data from the old computer to the new computer, stopping the old process on the old computer and starting the copy on the new computer. The initial decision is preferably implemented immediately after it is taken. The initial decision is preferably taken by one of the computers of the production plant.

The workpieces are preferably mounted on plate-like workpiece carriers, which in turn are placed on the transport sections. The transport sections preferably run in straight lines. The above-mentioned information carriers are preferably attached indirectly to the respectively assigned workpiece, namely to the respective workpiece carrier. They can also be attached to the workpiece directly. The transport sections preferably have at least one continuously rotating traction means, which carries the workpieces along with it by friction and is set in motion by the transport drive. It is highly preferable for each transport section to have two parallel traction means. The traction means can be conveyor belts or conveyor chains.

The computer network can be a wired or wireless computer network, with any mixed forms being possible. For example, a wired computer network can be built according to the Ethernet standard. For example, a wireless computer network can operate according to one of the standards WiFi, LTE, 5G, Ultra-Wideband (UWB), wherein any mixed forms are also possible here. Preferably, the computer network is based on the Internet or IP protocol.

The diverter device can be a diverter with a pivotable diverting arm. However, it can also be a lift transverse unit comprising a vertically movable deflection transport device, wherein the conveying direction of the associated conveyor section and the conveying direction of the deflection transport device are aligned perpendicular to each other.

In a processing station, for example, the processing that takes place can be a material removal from the workpiece or a joining of at least two components. The processing can also consist in a pure inspection of the workpiece, for example for dimensional stability.

It is conceivable that identical computers can be used to minimize costs due to high quantities. However, it is also conceivable to use computers that differ significantly in terms of their computing power. Mixed forms are also possible, i.e. many fairly slow computers of the same type and a few high-speed computers.

The conveyor sections can define a single conveying level. It is conceivable that the conveyor sections define multiple parallel conveying levels, wherein the workpieces are transferred between the conveying levels by means of elevators. It is also conceivable that the conveyor sections pass through the space on a curved path.

The detailed embodiments herein specify advantageous developments and improvements of the disclosure.

It can be provided that the initial decision is arrived at so as to prevent overloading of the computer network regardless of where on the computer network it takes place, and/or to prevent overloading of any single computer. The initial decision can be taken by simulating the utilization of the computer network and the computer beforehand for various possible initial decisions, and then selecting the variant that shows the most favorable behavior. However, it is also possible to monitor the utilization of the computer network and the computers during operation and if an overload is detected, to take the initial decision once again. Preferably, the control process which contributes the most to the detected overload is relocated to another computer.

The initial decision may be taken so as to minimize and/or limit the latency of the data exchange over the computer network. Preferably, the latencies of the data exchange between particularly critical control processes are continuously measured during the operation of the production plant. As soon as these measured latencies exceed specified limits, the initial decision is taken again. The latency is preferably minimized by the fact that, as part of the routing of the mentioned IP protocol, as few routers as possible have to be passed through. It can also be expressed in terms of minimizing the number of hops. A router sets up a connection between two subnets of the computer network. Latency refers to the amount of time required by a single data packet to be transmitted over the computer network from a source computer to a destination computer.

It may be provided that at least one diverter device and/or at least one processing station are each associated with a separate computer, wherein all stop gates, all reading devices and all transport drives are each connected to the spatially nearest of these computers. This minimizes the need to exchange data over the computer network from the outset. Preferably, a single computer is associated with each of the diverter devices and/or all the processing stations. It is at least conceivable that a plurality of computers are associated with one diverter or one processing station. The diverter devices and/or the processing stations preferably each form a module which can be installed in the production plant in a largely pre-assembled form. The computer is preferably a component of the relevant module.

It may be provided that the initial decision is taken and implemented once again if at least one computer and/or at least one computer network connection becomes inoperative and/or overloaded. The operational state of the relevant computers and/or computer network connections is preferably monitored automatically, in particular by means of a data exchange over the computer network.

It may be provided that all of the above control processes store a digital twin of the transport system, wherein the digital twin contains in particular the position of the workpieces on the transport system and information about the operational state of all computers and computer network connections. Preferably, the digital twin contains all the data of the transport system that can be used as part of its control. At least a portion of this data is determined by simulation. For example, the exact location of a workpiece is only known when it passes a reading device. For the remaining periods, the location of a workpiece can be calculated from the speed of the transport sections and the position of the diverter devices and the stop gates. It is therefore intended that in the digital twin, the location of a workpiece can be queried at any time. The networking of the plant components according to the disclosure enables all computers to access all plant components. Only the possible access speed depends on the respective computer, and this can be optimized as part of the initial decision.

It may be the case that each computer stores its own digital twin of the entire transport system. In large transport systems, however, it is advantageous if the digital twin of a computer only covers the close spatial environment of the relevant computer, wherein the digital twins of neighboring computers preferably overlap or are directly adjacent to each other.

It may be provided that a processing plan is specified for each workpiece processed by the production plant, wherein said plan specifies which types of processing stations, and if desired in which order, are to be passed through, wherein a plurality of the mentioned control processes cooperate in a second decision in which an automated decision is taken as to the route along which the workpiece is transported along the transport system, wherein the second decision takes into account the processing plan assigned to the workpiece and information stored in the digital twin.

Preferably, at least one type of processing station is present multiple times in the production plant. As part of the second decision, it is decided in particular which of these identical processing stations is used to process a specific workpiece. The second decision is preferably made in such a way that the production plant produces as many workpieces as possible per unit time. It is conceivable that individual workpieces are prioritized in such a way that their transit time through the production plant does not exceed a specified limit. Alternatively, it is conceivable that this transit time will be minimized.

The processing plan can contain processing steps that require the presence of different workpieces at the same processing station. This circumstance is preferably taken into account in taking the second decision. The different workpieces mentioned can be produced in parallel on the production plant.

The processing plan can contain processing steps in which a processing station generates a plurality of workpieces from one workpiece. For example, a plurality of individual parts can be broken out of a workpiece produced in the plastic injection molding process. This circumstance is preferably taken into account in taking the second decision. The two processing steps mentioned have the character of a branching point, so that overall a processing plan structured in the form of a tree or even a network results, rather than just a purely linear processing plan.

A processing plan can contain processing steps in which workpieces are rejected as unusable, for example after an inspection. This circumstance can be taken into account in the second decision for another workpiece.

It can be provided that each computer stores only a part of the entire digital twin, wherein each control process involved in the second decision uses only the part of the digital twin that is stored on a computer which executes a control process involved in the second decision, or on a computer in its immediate neighborhood, this condition being taken into account in the initial decision. This makes it a simple matter to minimize the data traffic over the computer network.

It can be provided that the digital twin contains information about the relative spatial position of the processing stations, the transport sections, the diverter devices, the curves, the stop gates, and the reading devices, this information being determined automatically and being taking into account in the second decision. The automated determination can take place, for example, by transporting a test workpiece carrier along a random or systematically selected path along the transport system. The reading devices can be used to detect that the carrier is at the relevant point of the transport system at the time of reading. The relative position of the components directly connected to a computer is known in advance. This relative spatial position can be determined by combining the two items of information mentioned. In addition, an automated distance measurement can be carried out between the system components. In this case, a computer network according to the Ultra-Wideband standard (UWB) is preferably used, as this enables a comparatively accurate distance measurement. The processing stations are preferably each permanently connected to a UWB tag. Preferably, a distance measurement system is used which measures the propagation time of electromagnetic waves in order to determine the distance (time-of-flight). Preferably, multiple distances are measured between different plant components, the relative position of the respective plant components being determined by triangulation.

It can be provided that when implementing the second decision, a plurality of control processes which are executed on different computers cooperate. This allows the data traffic over the computer network to be minimized. Preferably, the aim is that the control processes which directly adjust the diverter devices, the stop gates or the transport drives should run on the directly associated computer. The cooperating control processes preferably exchange auxiliary data over the computer network which does not result in direct adjustment of the diverter devices, the stop gates, or the transport drives. This auxiliary data requires comparatively little transmission bandwidth.

It can be provided that the initial decision is taken and, if applicable, implemented once again when a new workpiece is fed into the production plant. It goes without saying that no implementation is necessary if the initial decision is not changed by the new workpiece. Preferably, the production plant is designed in such a way that a change in the initial decision due to a new workpiece rarely takes place. However, if the production plant produces a large number of workpieces that differ significantly from each other, it can easily happen that a different distribution of the control processes between the different computers takes place with each new workpiece that is fed in.

It may be provided that it is determined automatically whether a processing station and/or a diverter device and/or a transport section is inoperative or slowed down, wherein the second decision is taken and implemented once again in relation to at least one workpiece if at least one of the above-mentioned states changes. The production plant thus responds automatically to the failure of individual plant components. Preferably, processing stations that have a long processing time and/or high failure probability are present in a multiply redundant form.

It may be possible to provide at least one workpiece with an Ultra-Wideband tag, wherein the position of this workpiece within the transport system is determined by means of the Ultra-Wideband tag. This means that an accurate measurement of the position of the relevant workpiece is possible at any time. This can support or replace the simulation of the position of a workpiece on the transport system, discussed above. Preferably, the test workpiece carrier discussed above is equipped with the Ultra-Wideband tag. The corresponding position measurement is then preferably used in the automatic determination of the relative position of the system components.

It goes without saying that the aforementioned features and those yet to be explained below can be applied not only in the corresponding specified combination, but also in other combinations or in isolation, without departing from the scope of the present disclosure.

BRIEF DESCRIPTION OF THE DRAWINGS

The disclosure will be described in more detail in the following by reference to the attached drawings. In the drawings.

DETAILED DESCRIPTION

Figure 1:
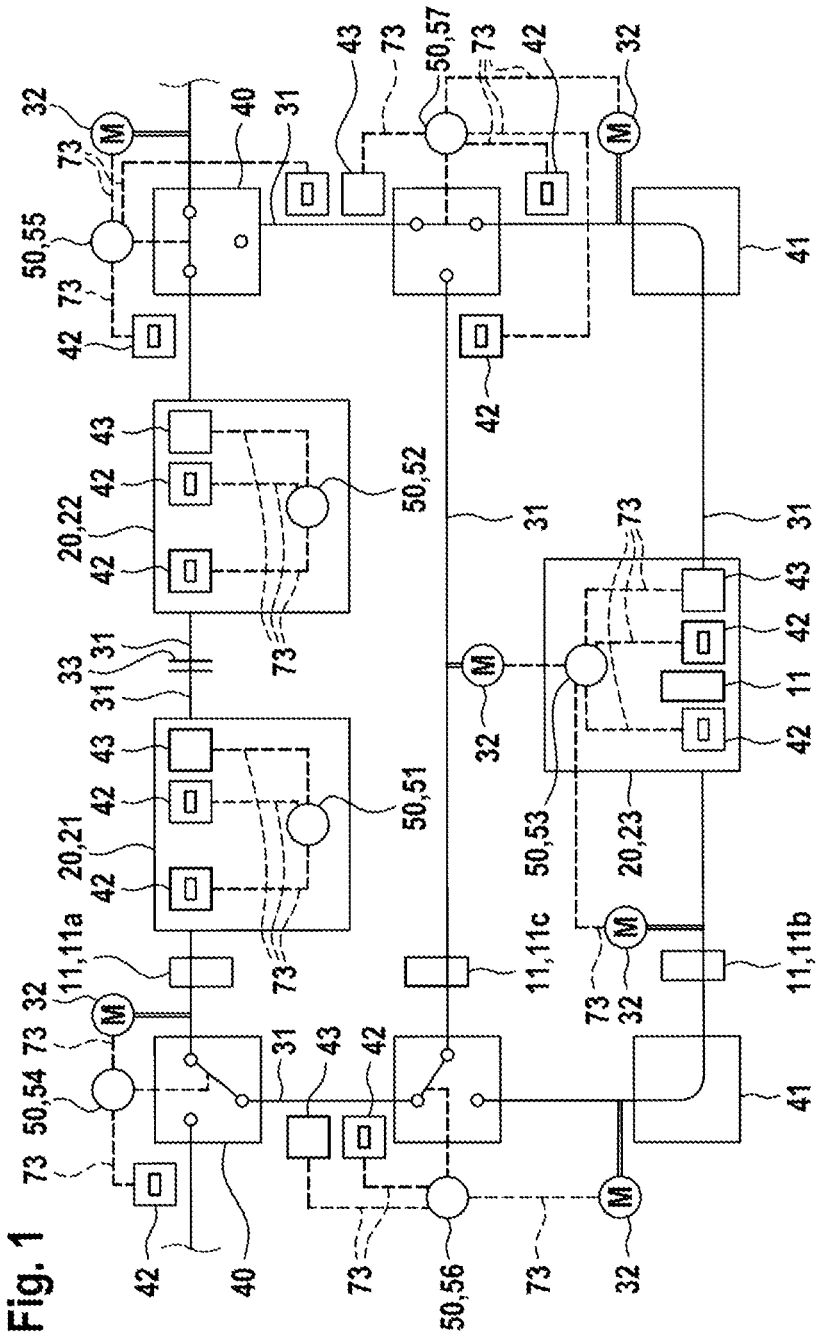
FIG. 1 shows a rough schematic view of a production plant according to the disclosure.

FIG. 1 shows a rough schematic view of a production plant 10 according to the disclosure. The mechanical components of the corresponding transport system 30 are known, although in some cases they may be modified in minor ways for the disclosure. Purely by way of example, reference is made to https://www.boschrexroth.com/de/de/produkte/produktgruppen/montagetechnik/transfers ysteme/transfersystem-ts-1 and https://www.boschrexroth.com/de/de/produkte/produktgruppen/montagetechnik/transfers ysteme/transfersystem-ts-2plus, where the Rexroth TS1 and T2plus transport systems with all their components are described. The exemplary production plant 10 shown in a rough schematic view in FIG. 1 can be constructed both according to the TS1 system and the T2plus system.

Firstly, the transport system 10 in this case comprises a total of six transport sections 31, each of which is designed as a straight double-belt conveyor. They therefore have two parallel, continuously rotating conveyor belts or conveyor chains, each of which is set in motion by a common transport drive 32, namely an electric motor. The conveyor belts always run in the same direction, usually at a constant speed. It is of course possible to adapt the transport speed and the transport direction to the requirements of the production process. The workpieces 11 to be processed are transported on the transport sections 31. These are typically carried on a plate-like, usually square, workpiece carrier, which in turn rests directly on the above-mentioned conveyor belts, so that it is carried along by friction.

The individual transport sections 31 are immediately adjacent to each other at diverter devices 40, at curves 41 or at junctions 33. They usually pass through the processing stations 20 without interruption. The same applies to the straight-through path of a diverter device 40. The diverter devices 40 can be lift transverse units (see e.g. DE 10 2018 204 644 A1), but other constructions (see e.g. DE44 39107 C2) are also known. Common to all the diverter devices 40 is that two transport sections 31 abut each other in a T-shape, wherein the path taken by the workpiece 11 is switchable. Curves 41 are known, for example, from DE44 31836 B4 or DE 195 00 546 B4. In a curve 41, two transport sections 31, which differ in their direction, usually by 90° or 180°, are adjacent to each other. A curve 41 is usually designed in such a way that the workpiece 11 is driven along the entire curve path.

A further element of the transport system 30 according to the disclosure is formed by the stop gates 42, which can be used to stop the workpieces 11 despite the continuation of the transport section 31. For this purpose, a stop for the workpieces 11 is usually raised above the conveying plane defined by the conveyor belts. If the stop is lowered below the transport plane, the workpiece 11 can continue to move along the conveyor section 31. Such a stop gate 42 is known from EP 2 072 429 B1. The processing stations 20 are typically equipped with two stop gates 42. A first stop gate is used to accumulate several workpieces 11 as a working stock. A second stop gate holds a single workpiece 11 in the processing position, where it can also be precisely aligned by means of a positioning device (not shown). For example, the diverter devices 40 are provided with a stop gate on an inlet side, so that it can be ensured that only a single workpiece 11 passes through the diverter device 40 at a time.

It is also important to point out the reading devices 43 which are located at different points of the transport system 30. The workpieces 11, in particular the workpiece carriers, are equipped with information carriers, which in most cases are RFID tags that can be read out wirelessly, wherein optically readable barcodes or QR codes can also be used. A reading device 43 can read the information carrier when the workpiece 11 is located in a narrowly confined reading range of the reading device 43. In the simplest case, a unique serial number of the workpiece 11 or the workpiece carrier is read. RFID tags can also store information that is sent or written by one reading device 43 and read out by another reading device 43. In addition to the above-mentioned reading devices 43 with a narrowly confined reading range, additional reading devices (not shown) may be available with a larger reading range which can cover the entire production plant 10.

The transport sections 31 are linked to a branching system of transport routes by means of the diverter devices 40 and the curves 41. For example, a workpiece 11 entering from the top left in FIG. 1 can be transported to all three processing stations 21; 22; 23. From there it can be transported onward to the exit at the top right in FIG. 1. A transport route is also provided via which all the processing stations 20 can be bypassed.

The transport system 30 according to the disclosure comprises a plurality of computers 50. They can be at least capable of running a Linux operating system or a comparable operating system. In order to save costs, it is preferable to use computers 50 that are less powerful, such as microcontrollers. In the simplest case, each processing station 20 and each diverter device 40 is spatially associated with a computer 50, so that the cable paths 73 to the connected stop gates 42, reading devices 43 and transport drives 32 are short. Via these cable paths 73 a data exchange 73 can take place between the relevant computer 50 and the above-mentioned components 42; 43; 32. The computer 50 can therefore control the directly connected components 42; 43; 32 or read data from them.

Figure 2:
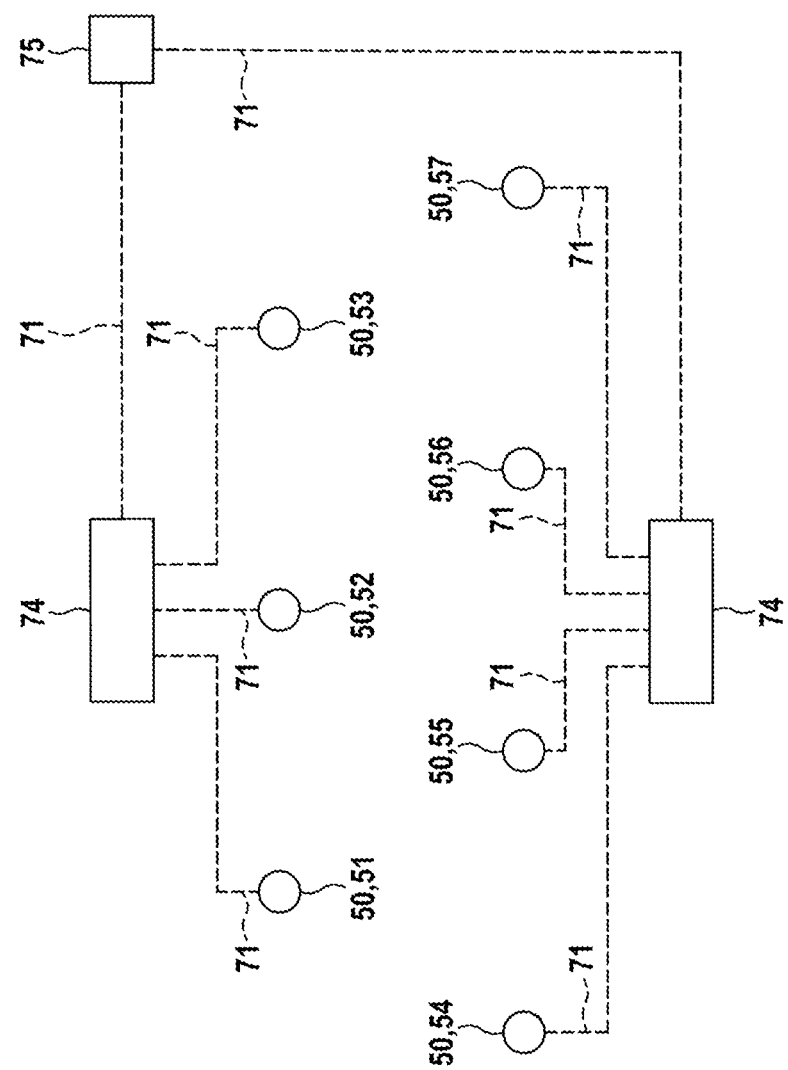
FIG. 2 shows a diagram of the computer network connections between the computers.

In addition, the various computers 51-57 are connected for data exchange via a computer network (no. 71 in FIG. 2). The computers 50 are configured in such a way that each computer 50 can enter into a data exchange connection with the components 42; 43; 32 connected to another computer.

Computer networks used for control purposes are known from the prior art, such as PROFINET (https://de.wikipedia.org/wiki/Profinet) or Sercos (https://www.sercos.de/). These are characterized by a real-time data exchange capability. Within the scope of the present disclosure, the use of such complex systems for the data exchange on the computer network is deliberately avoided. Rather, it is intended that simple messages in a binary format will be exchanged asynchronously over the computer network. Real-time control is preferably carried out solely via the direct cable paths 73 to the computers 50. This can significantly minimize the transmission bandwidth occupied on the computer network 71. The initial decision according to the disclosure can be used, among other things, to implement the control of the entire plant in real time, i.e. with specified maximum response times.

FIG. 2 shows a diagram of the computer network connections 71 between the computers 51-57. For example, the computers 51-52 in the processing stations (No. 20 in FIG. 1) can each be connected to a shared network switch 74, so that they can send Ethernet or WiFi messages among themselves directly without the need for IP routing. For example, the computers 54-57 in the processing stations (No. 40 in FIG. 1) can each be connected to a shared network switch 74, so that they can send Ethernet or WiFi messages among themselves directly without the need for IP routing.

The two exemplary network switches 74 are connected to a network router 75 which uses IP routing to enable data exchange between the two subnets defined by the network switches 74. A consequence of this network structure is that, for example, a data exchange between the computers 51 and 53 has a lower latency than a data exchange between the computers 51 and 56. In the first case, only the upper subnet in FIG. 2 is required for the data exchange, while the lower subnet and the network router are not used for the data exchange. In the second case, the entire computer network is occupied for the data exchange. This precise fact can be taken into account in taking the initial decision according to the disclosure, by this decision being taken in such a way that none of the computer network connections 71 shown in FIG. 2 is overloaded. It goes without saying that the network switches 74 and the network routers 75 are an integral component of these computer network connections 71, so that their overloading is also important.

It is conceivable that the above-mentioned network switches 74 and the above-mentioned network routers 75 are integrated into an associated computer 50. It is conceivable that all computers 50 are connected exclusively by means of point-to-point connections.

Figure 3:
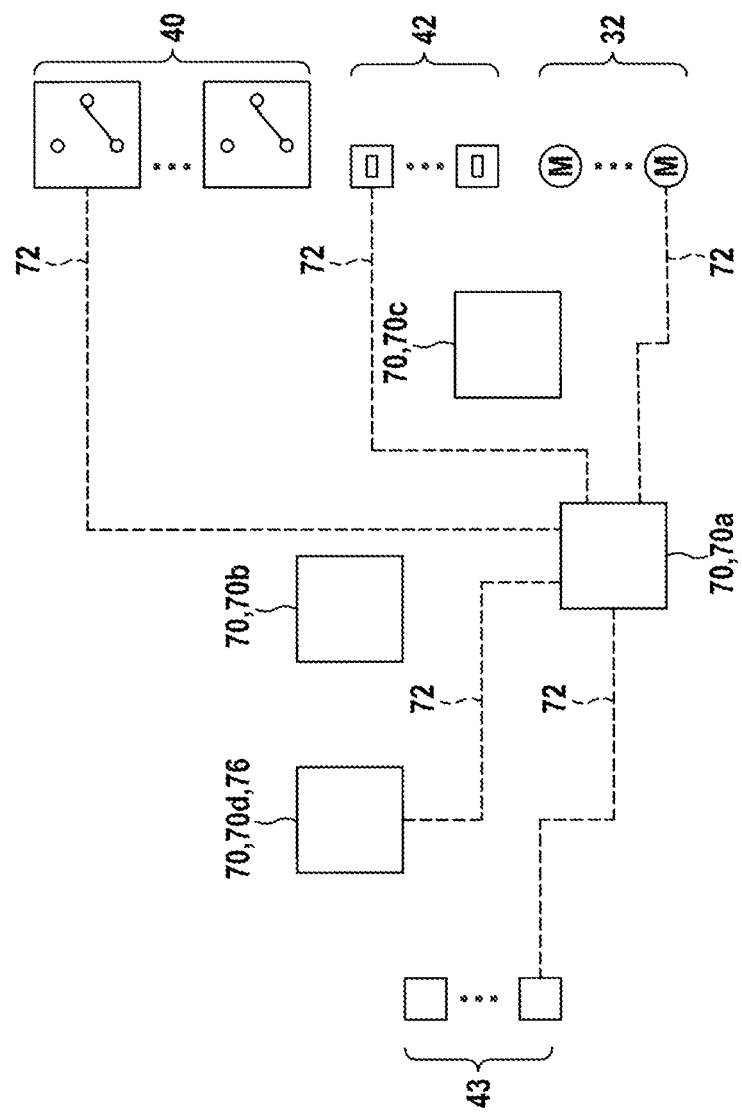
FIG. 3 shows a diagram of the data exchange connections between the reading devices, the stop gates, the transport drives, and the control processes.

FIG. 3 shows a diagram of the data exchange connections 72 between the reading devices 43, the stop gates 42, the transport drives 32, the diverter devices 40 and the control processes 70; 70a; 70b; 70c; 70d. According to the disclosure, a plurality of control processes 70 should be available. For example, it may be intended to execute a control process 70 for each workpiece (no. 11 in FIG. 1). This control process would therefore have to take the second decision and decide which processing station should be approached next. In FIG. 1, for example, the processing station 51 and 52 are of the same type. The first control process 70a for the workpiece 11a in FIG. 1 would therefore have to decide which of the two processing stations 51 and 52 in FIG. 1 it will approach next. As a result, the stop gates 42 and the transport drives 32 would have to be controlled accordingly. In order to take this second decision, the first control process 70a requires information that is as comprehensive as possible about the state of the production plant, which is provided by a digital twin 76 implemented by a fourth control process 70d.

The fourth control process 70d subsequently exchanges data with almost every component of the production plant. As a result, in terms of the utilization of the computer network it is largely immaterial on which computer 50 the fourth control process 70d is running. In order to minimize the utilization of the computer network, at least when querying data from the digital twin, it is preferable to provide a copy of the digital twin on many computers, or even on all computers, which at least comprises the immediate environment of the respective computer. The various (partial) copies are implemented by other control processes, which are not shown in FIG. 3. The digital twin 76 is preferably implemented using "conflict free replicated data types" (https://en.wikipedia.org/wiki/Conflict-free_replicated_data_type), so that the various copies are reliably consistent over time.

When implementing the above-mentioned second decision, the first control process 70a usually only adjusts the stop gates 42 and transport drives 32 that are arranged in its immediate vicinity. Considering the first workpiece 11a in FIG. 1, the lowest loading on the computer network would result if the first control process 70a were to be executed on the first computer 51 in FIG. 1. This is precisely the subject of the initial decision according to the disclosure, for example. When the first workpiece moves through the production plant as processing progresses, the initial decision is made again multiple times with the result that the first control process 70a is executed on another computer. For example, the software package MOSIX (http://www-.mosix.cs.huji.ac.il/pub/MOSIX_wp.pdf) can be used to transfer a control process from one computer to another. It is also possible to run the various control processes using containers (see e.g. https://de.wikipedia.org/wiki/LXC), since such containers can be transferred from one computer to another very easily.

The programming language Erlang (https://www.erlang.org/) is preferred when using less powerful computers, wherein its virtual machine is used in particular. A corresponding software architecture is known from the website https://www.grisp.org/.

REFERENCE SIGNS 10 production plant
11 workpiece
11a first workpiece
11b second workpiece
11c third workpiece
20 processing station
21 first processing station
22 second processing station
23 third processing station
30 transport system
31 transport section
32 transport drive
33 junction between two adjacent transport sections
40 diverter device
41 curve
42 stop gate
43 reading device
50 computer
51 first computer
52 second computer
53 third computer
54 fourth computer
55 fifth computer
56 sixth computer
57 seventh computer
70 control process
70a first control process
70b second control process
70c third control process
70d fourth control process
71 computer network connection
72 data exchange
73 cable path for data exchange, bypassing the computer network
74 network switch
75 network router
76 digital twin

What is claimed is:

1. A method for operating a production plant having a plurality of processing stations, the method comprising:
   transporting, using a transport system, workpieces to be processed to the plurality of processing stations, the transport system including a plurality of transport sections, each transport section having a transport drive configured to transport the workpieces, the plurality of transport sections being connected by switchable diverter devices such that the plurality of transport sections form a branched system of transport routes by which the workpieces are transported to the plurality of processing stations;
   providing a plurality of stop gates, each stop gate being arranged on an associated transport section of the plurality of transport sections and being configured to stop the workpieces;
   providing a plurality of reading devices, each respective reading device being arranged on an associated transport section of the plurality of transport sections and being configured to read an information carrier that is attached to the workpieces passing by the respective reading device;
   providing a plurality of separate computers of the transport system that are connected and configured to exchange data via a computer network, wherein each of the plurality of transport sections, each of the plurality of stop gates, each of the switchable diverter devices, and each of the plurality of reading devices are directly connected to a respectively assigned computer of the plurality of separate computers to exchange data with the respectively assigned computer, bypass the computer network, and exchange data with remaining computers of the plurality of separate computers via the computer network;
   controlling the switchable diverter devices, the transport drives of each of the plurality of transport sections, and the stop gates using a plurality of separate control processes that are executed in parallel or quasi-parallel and taking into account information from the reading devices, the switchable diverter devices, the transport drives of each of the plurality of transport sections, and the stop gates communicating with one another exclusively via messages transmitted via the computer network;

automatically, during the operation of the production plant, making an initial decision about which of the plurality of separate control processes is executed on which of the plurality of separate computers; and automatically implementing the initial decision.

2. The method according to claim 1, the automatically making the initial decision further comprising: making the initial decision so as to at least one of (i) prevent overloading of the computer network, regardless of where on the computer network the overloading takes place and (ii) prevent overloading of any single computer of the plurality of separate computers.

3. The method according to claim 1, the automatically making the initial decision further comprising: making the initial decision such that a latency of data exchange over the computer network is at least one of minimized and limited.

4. The method according to claim 1, wherein: a separate computer of the plurality of separate computers is associated with each of at least one of (i) the switchable diverter devices and (ii) the plurality of processing stations; and all of the plurality of stop gates, all of the plurality of reading devices, and the transport drives of all of the plurality of transport sections are connected to a physically nearest computer of the plurality of separate computers.

5. The method according to claim 1 further comprising: making and implementing the initial decision once again in response to at least one of (i) a computer of the plurality of separate computers and (ii) at least one computer network connection of the computer network becoming at least one of inoperative and overloaded.

6. The method according to claim 1, wherein all of the plurality of separate control processes store a digital twin of the transport system, the digital twin containing a position of the workpieces on the transport system and information about operational states of all of the plurality of separate computers and all computer network connections of the computer network.

7. The method according to claim 6, wherein: for each of the workpieces processed by the production plant, a processing plan is specified that specifies which types of processing stations of the plurality of processing stations are to be passed through; and at least some of the plurality of separate control processes cooperate in a second decision in which an automated decision is made as to the route along which at least one of the workpieces is transported along the transport system, wherein the second decision takes into account the processing plan assigned to the least one of the workpieces and information stored in the digital twin.

8. The method according to claim 7, wherein: each computer of the plurality of separate computers stores only a part of an entirety of the digital twin; and each of the plurality of separate control processes involved in the second decision uses only the part of the digital twin that is stored on one of (i) a respective computer of the plurality of separate computers which executes one of the plurality of separate control processes involved in the second decision, and (ii) a computer of the plurality of separate computers in an immediate neighborhood of the respective computer, this condition being taken into account in the initial decision.

9. The method according to claim 7, wherein the digital twin contains information about a relative spatial position of the plurality of processing stations, the plurality of transport sections, the switchable diverter devices, the plurality of stop gates, and the plurality of reading devices, the information about the relative spatial position being determined automatically and being taking into account in the second decision.

10. The method according to claim 7, wherein, in the implementation of the second decision, a plurality of control processes cooperate, the plurality of control processes being executed on different computers of the plurality of separate computers.

11. The method according to claim 10 further comprising: implementing the initial decision once again in response to a new workpiece being fed into the production plant.

12. The method according to claim 7 further comprising: automatically determining whether at least one of (i) a processing station of the plurality of processing stations, (ii) one of the switchable diverter devices, and (ii) a transport section of the plurality of transport sections is one of inoperative and slowed down; and making and implementing the second decision once again in relation to at least one workpiece in response to determining that at least one of (i) the processing station of the plurality of processing stations, (ii) the one of the switchable diverter devices, and (ii) the transport section of the plurality of transport sections is one of inoperative and slowed down.

13. The method according to claim 1, wherein at least one of the workpieces is equipped with an ultra-wideband tag, the method further comprising: determining a position of the at least one of the workpieces within the transport system using the ultra-wideband tag.

14. The method according to claim 7, wherein the processing plan further specifies an order in which the processing stations of the plurality of processing stations are to be passed through.

* * * * *